US008687360B2

(12) United States Patent
Nakada

(10) Patent No.: US 8,687,360 B2
(45) Date of Patent: Apr. 1, 2014

(54) CONVERTIBLE PC HAVING A WATERPROOFING STRUCTURE

(75) Inventor: Kazuo Nakada, Kanagawa-Ken (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 312 days.

(21) Appl. No.: 12/861,631

(22) Filed: Aug. 23, 2010

(65) Prior Publication Data

US 2012/0044155 A1 Feb. 23, 2012

(51) Int. Cl.
*G06F 1/16* (2006.01)
*A47B 81/00* (2006.01)

(52) U.S. Cl.
USPC ............. 361/679.55; 361/679.56; 312/223.1; 312/223.2

(58) Field of Classification Search
USPC ............. 361/679.01–679.45, 679.55–679.59; 312/223.1, 223.2; 455/575.1, 575.3
See application file for complete search history.

(56) References Cited

U.S. PATENT DOCUMENTS

| | | | | |
|---|---|---|---|---|
| 5,260,885 A | * | 11/1993 | Ma | 361/679.26 |
| 5,497,296 A | * | 3/1996 | Satou et al. | 361/679.09 |
| 5,706,168 A | * | 1/1998 | Erler et al. | 361/679.34 |
| 6,031,524 A | * | 2/2000 | Kunert | 345/173 |
| 7,184,263 B1 | * | 2/2007 | Maskatia | 361/679.27 |
| 7,525,792 B2 | * | 4/2009 | Yokote | 361/679.02 |
| 7,864,515 B2 | * | 1/2011 | Numata et al. | 361/679.21 |
| 7,907,394 B2 | * | 3/2011 | Richardson et al. | 361/679.3 |
| 8,155,717 B1 | * | 4/2012 | Watson | 455/575.3 |
| 2005/0105263 A1 | * | 5/2005 | Tanaka et al. | 361/683 |
| 2008/0232054 A1 | * | 9/2008 | Chen et al. | 361/681 |
| 2009/0244009 A1 | * | 10/2009 | Staats et al. | 345/168 |
| 2009/0303673 A1 | * | 12/2009 | Holzhausen | 361/679.17 |
| 2011/0024315 A1 | * | 2/2011 | Kim | 206/320 |
| 2012/0008258 A1 | * | 1/2012 | Hsu | 361/679.01 |

FOREIGN PATENT DOCUMENTS

JP 1993-53687 A 3/1993

OTHER PUBLICATIONS http://www.panasonic.net/avc/toughbook/full/ruggedized/.

* cited by examiner

*Primary Examiner* — Jayprakash N Gandh
*Assistant Examiner* — Nidhi Desai
(74) *Attorney, Agent, or Firm* — Shimokaji & Assoc., PC

(57) ABSTRACT

An electronic apparatus includes a lower housing, a folding linkage, an upper housing, and a gasket. The lower housing may contain a keyboard. The folding linkage assembly may be adapted to connect to the lower housing at the second end and to the upper housing at the first end. The upper housing may contain a screen. The upper housing may be operably mounted to and pivotable with respect to the folding linkage. The gasket may be used to effect a seal between the lower housing and the upper housing.

13 Claims, 5 Drawing Sheets

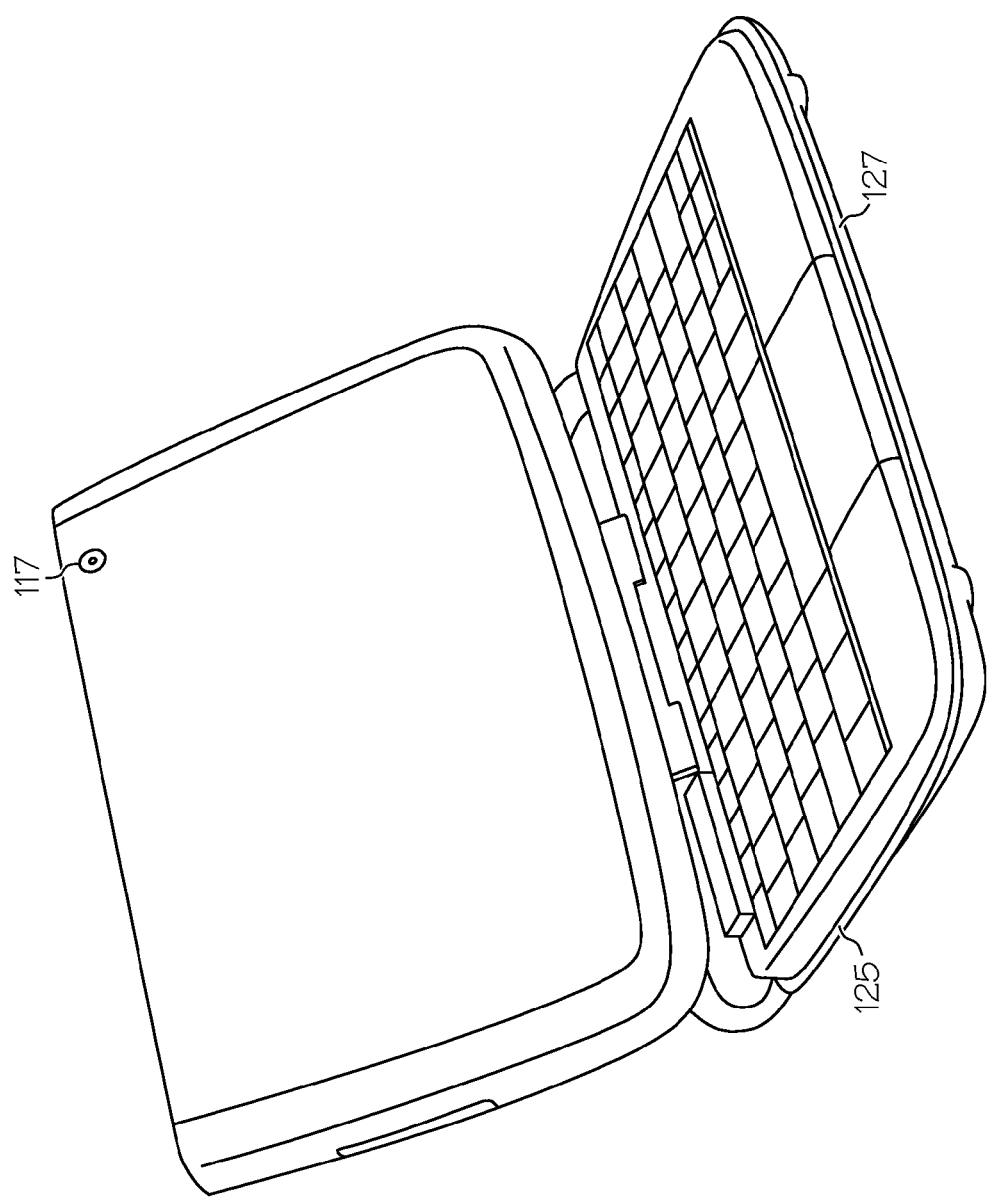

CONVERTIBLE PC HAVING A WATERPROOFING STRUCTURE

BACKGROUND OF THE INVENTION

The present invention relates generally to a personal computer (PC) convertible between a tablet configuration and a keyboard operation configuration and, more specifically, to a convertible PC having a waterproof structure.

In recent years, mobile computing devices such as personal digital assistants (PDAs), notebook computers, convertible personal computers (PCs), and tablet PCs have become increasingly popular due to their portability and increased functionality. In many instances, these devices have a lower housing which may contain a keyboard for ease of data entry, and an upper housing that is hinged to the lower housing for viewing images, graphics, or text. The upper housing is typically arranged for rotational movement about and transverse to an axis at the intersection of the lower housing and the upper housing. The range of tilting movement of the display is limited in the vertical direction about the axis of rotation and, accordingly, results in a limited freedom of movement of the display with respect to the lower housing.

More recently, with the increasing popularity of wireless networks at individual homes and restaurants, people are using their laptop computers to either surf the internet or work while also consuming beverages. In these types of environments, people may have wet fingers or may spill their coffee, tea, or soft drinks on their computers. If there is no waterproof function for computers, liquid may damage the circuit boards of the electronic devices and the operating functions of the electronic device may be impaired.

Therefore, it can be seen that there is a need for a convertible PC having a waterproof structure.

SUMMARY

In one aspect, an computing apparatus comprises a lower housing; a folding linkage assembly adapted to connect to the lower housing; an upper housing operably mounted to and pivotable with respect to the folding linkage assembly for movement between a tablet mode and a keyboard operation mode, the folding linkage assembly having a first end coupled to a first folding linkage receiving element disposed transversely across an upper housing cover side surface and a second end coupled to a second folding linkage receiving element disposed transversely across a rear portion of the lower housing; and latches disposed on side walls of the upper housing adapted to release the upper housing from the lower housing when converting the computing apparatus from the tablet mode to the keyboard operation mode.

In another aspect, an electronic computing device comprises a lower housing having a bottom and an oppositely disposed platform operational surface; an upper housing having a screen side and an oppositely disposed cover side, the upper housing being operatively coupled to the lower housing for movement between a tablet mode and a keyboard operation mode; a gasket adapted to effect a seal between the lower housing and the upper housing which, upon closing of the lower housing and the upper housing, the gasket is sandwiched therebetween and the screen is visible from an exterior of the electronic device; and latches disposed on side walls of the upper housing adapted to release the upper housing from the lower housing when converting the electronic computing device from the tablet mode to the keyboard operation mode.

In a further aspect, a mobile computing device comprises a lower housing having a plurality of side walls; an upper housing having a screen carried on a first side and a cover carried on a second, opposite side, the upper housing being operably coupled to the lower housing for movement between a tablet mode and a keyboard operation mode, wherein, in the tablet mode, the upper housing seals with the lower housing with a gasket sandwiched therebetween; a folding linkage assembly having a first end coupled to a first folding linkage receiving element disposed transversely across the upper housing cover side surface and a second end coupled to a second folding linkage receiving element disposed transversely across a rear portion of the lower housing; and latches disposed on side walls of the upper housing adapted to release the upper housing from the lower housing when converting the mobile computing device from the tablet mode to the keyboard operation mode.

These and other features, aspects and advantages of the present invention will become better understood with reference to the following drawings, description and claims.

BRIEF DESCRIPTION OF THE DRAWINGS

FIG. 3 is a perspective view of a convertible PC in the keyboard operation mode, according to an exemplary embodiment;

DETAILED DESCRIPTION OF EMBODIMENTS

The following detailed description is of the best currently contemplated modes of carrying out exemplary embodiments. The description is not to be taken in a limiting sense, but is made merely for the purpose of illustrating the general principles, since the scope of the embodiments is best defined by the appended claims.

Various inventive features are described below that can each be used independently of one another or in combination with other features.

Broadly, exemplary embodiments provide a waterproof structure for preventing liquid from getting inside electronic devices. More specifically, exemplary embodiments of a convertible PC have a gasket for effecting a seal between an upper housing and a lower housing of the convertible PC, thereby preventing liquid from getting into circuit boards of the PC. According to exemplary embodiments, a folding linkage may be used to connect the upper housing and the lower housing. The folding linkage may provide a mechanism for the upper housing to move pivotally from a tablet mode (with the upper housing covering the lower housing and the screen facing outward) to a keyboard operation mode (with the upper housing being disposed in an angled position with respect to the lower housing) similar to a conventional laptop.

In the tablet mode, a sealed enclosure may be formed by sealing the upper housing to the lower housing with the gasket sandwiched therebetween. A keyboard, connectors, the folding linkage, and other electronic mechanisms may be located within the sealed enclosure. In exemplary embodiments, to convert from the tablet mode to a keyboard operating mode, the upper housing may pivot over substantially 180 degrees of angular movement with respect to the lower housing.

Figure 1:
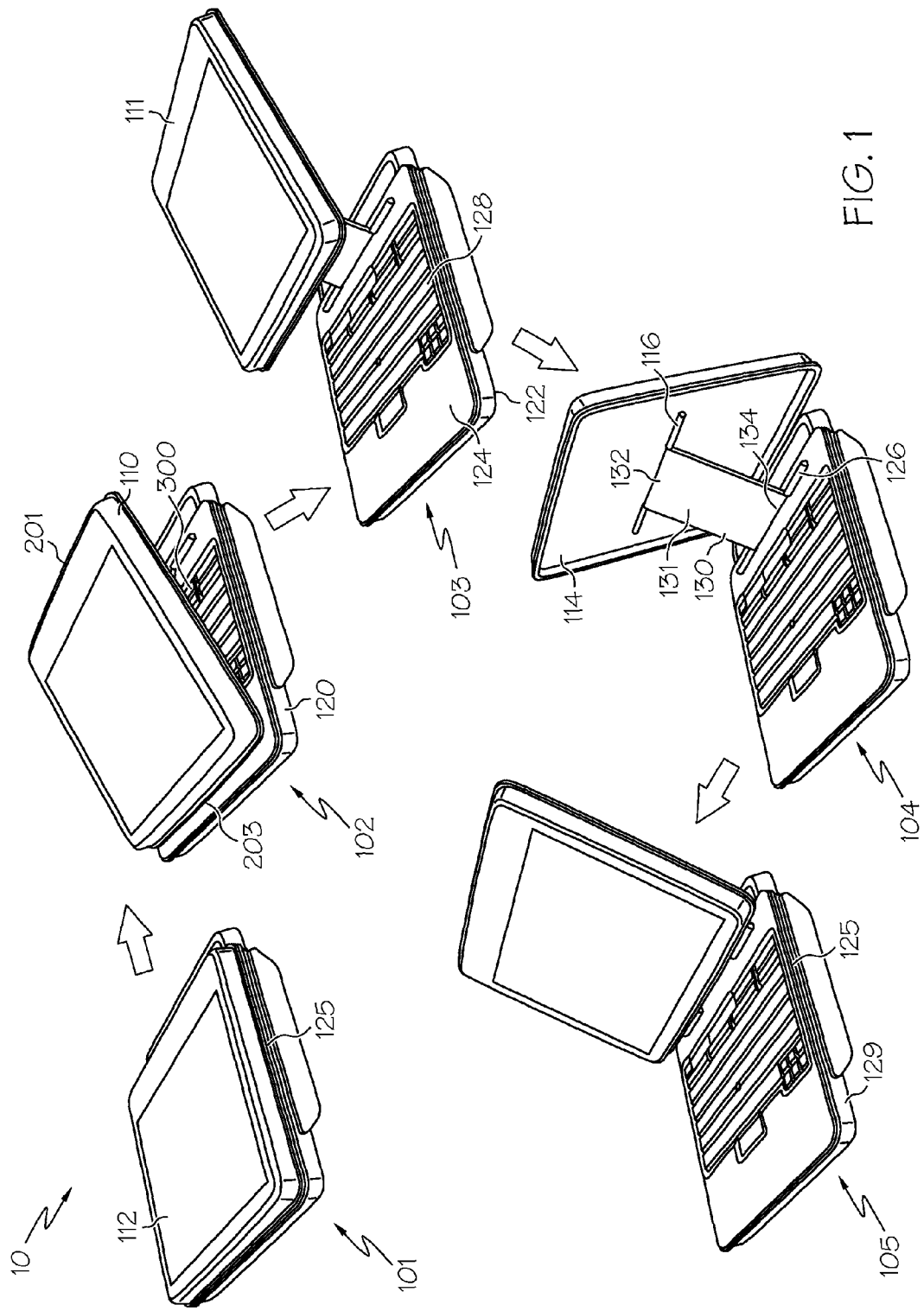
FIG. 1 is a flow diagram showing the steps for converting a convertible PC from a tablet mode to a keyboard operation mode according to an exemplary embodiment.

Referring to FIG. 1, a convertible PC 10 may comprise an upper housing 110 and a lower housing 120, wherein the upper housing 110 and the lower housing 120 may be connected via a folding linkage assembly 130 and may be sealed together by a gasket 125.

The upper housing 110 may further include a screen side 111 and a cover side 114 which is on the opposite side of the screen side 111. The upper housing 110 may include a top edge 201 and a bottom edge 203. A liquid crystal display (LCD) screen 112 may be disposed on the screen side 111 of the upper housing 110. A watertight seal may be formed around the LCD screen within the screen side 111 of the upper housing 110. The lower housing 120 may include a bottom 122, a side wall 129, a platform operational surface 124, and the gasket 125. A keyboard 128 may be installed on the platform operational surface 124.

The folding linkage assembly 130, connecting the upper housing 110 with the lower housing 120, may have a first end 132 which may be coupled to a first folding linkage receiving element 116. The first folding linkage receiving element 116 may be disposed transversely across the cover side 114 of the upper housing 110. The folding linkage assembly 130 may have a second end 134 which may be coupled to a second folding linkage receiving element 126. The second folding linkage receiving element 126 may be disposed transversely across a rear portion of the lower housing 120. The folding linkage assembly 130 may serve to not only support the upper housing 110, but also to provide a connection mechanism between the upper housing 110 and the lower housing 120.

The folding linkage assembly 130 and the upper housing 110 may pivot on the second folding linkage receiving element 126 over substantially 180 degrees of angular movement with respect to the lower housing 120. The upper housing 110 may also pivot on the first folding linkage receiving element 116 over substantially 180 degrees of angular movement with respect to the lower housing 120.

Figure 4:
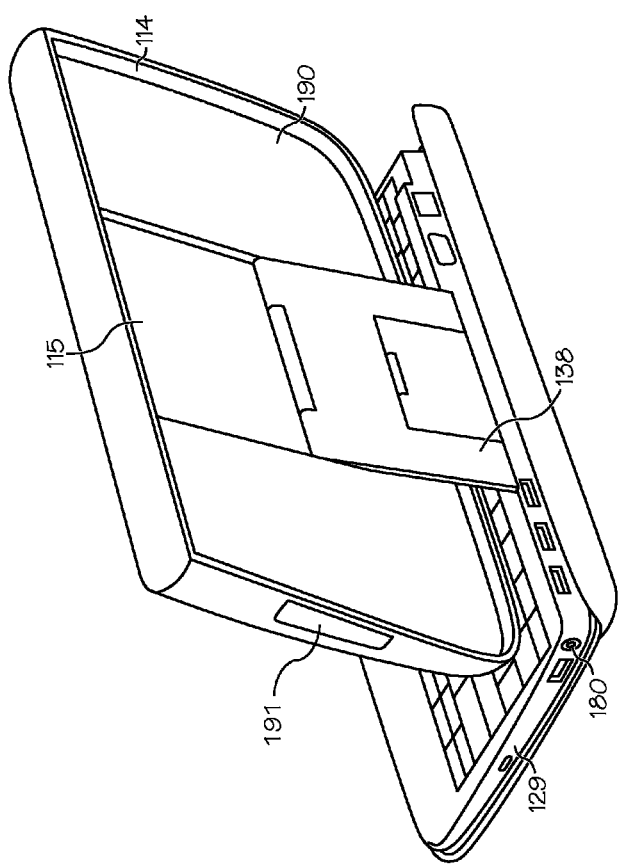
FIG. 4 is a perspective view of the keyboard operation mode of a convertible PC, showing a battery pack on a cover side of an upper housing, according to an exemplary embodiment.

Still in FIG. 1, the folding linkage assembly 130 may further include an inwardly facing surface side 131 and an oppositely disposed outwardly facing surface side 138 (see FIG. 4).

In operation, when the convertible PC 10 is in the tablet mode, as shown in step 101 of FIG. 1, the inwardly facing surface side 131 of the folding linkage assembly 130 may be disposed adjacent to and substantially parallel with the platform operational surface 124 of the lower housing 120. Also in step 101, the outwardly facing surface side 138 of the folding linkage assembly 130 may be disposed adjacent to and substantially parallel with the cover side 114 of the upper housing 110. In step 101, the connectors 180 (shown in FIG. 4), the keyboard 128, and other electronic mechanisms may be disposed within a sealed environment 300 formed between the upper housing 110 and the lower housing 120. An additional connector (not shown), for use as a power input, may be disposed on the side wall 129 when the convertible PC is in the tablet mode. Rubber seals (not shown) may be used to cover the additional connector in order to prevent water from coming through the connector. When the convertible PC 10 is in the tablet mode, the folding linkage assembly operatively interfaces the lower housing 120 and the upper housing 110.

In moving from step 101 to step 102 shown in FIG. 1, the top edge 201 of upper housing 110 may be lifted, thereby causing the first end 132 of the folding linkage assembly 130 to move upward and pivot on the first folding linkage receiving element 116, while second end 134 pivots on second folding linkage receiving element 126. At step 103, the top edge 201 and the bottom edge 203 of the upper housing 110 may be further moved upward and pivots on the second folding linkage receiving element 126 while the folding linkage assembly 130 is moved upward and pivots on the second folding linkage receiving element 126. In moving from step 103 to step 104, the upper housing may be rotated angularly on the first folding linkage receiving element 116 with the top edge 201 being moved downward and the bottom edge 203 being moved upward. At step 105, the bottom edge 203 may be rotated angularly on the first folding linkage receiving element 116 with the top edge 201 being moved upward and the convertible PC may convert fully into the keyboard operation mode.

In the keyboard operation mode, the LCD screen 112 may be in an angled orientation with respect to the lower housing 120. As can be seen from the above steps 101 through 105, the folding linkage assembly 130 may provide articulated movement of the upper housing 110 between the tablet mode in step 101 and the keyboard operation mode in step 105.

Figure 2:
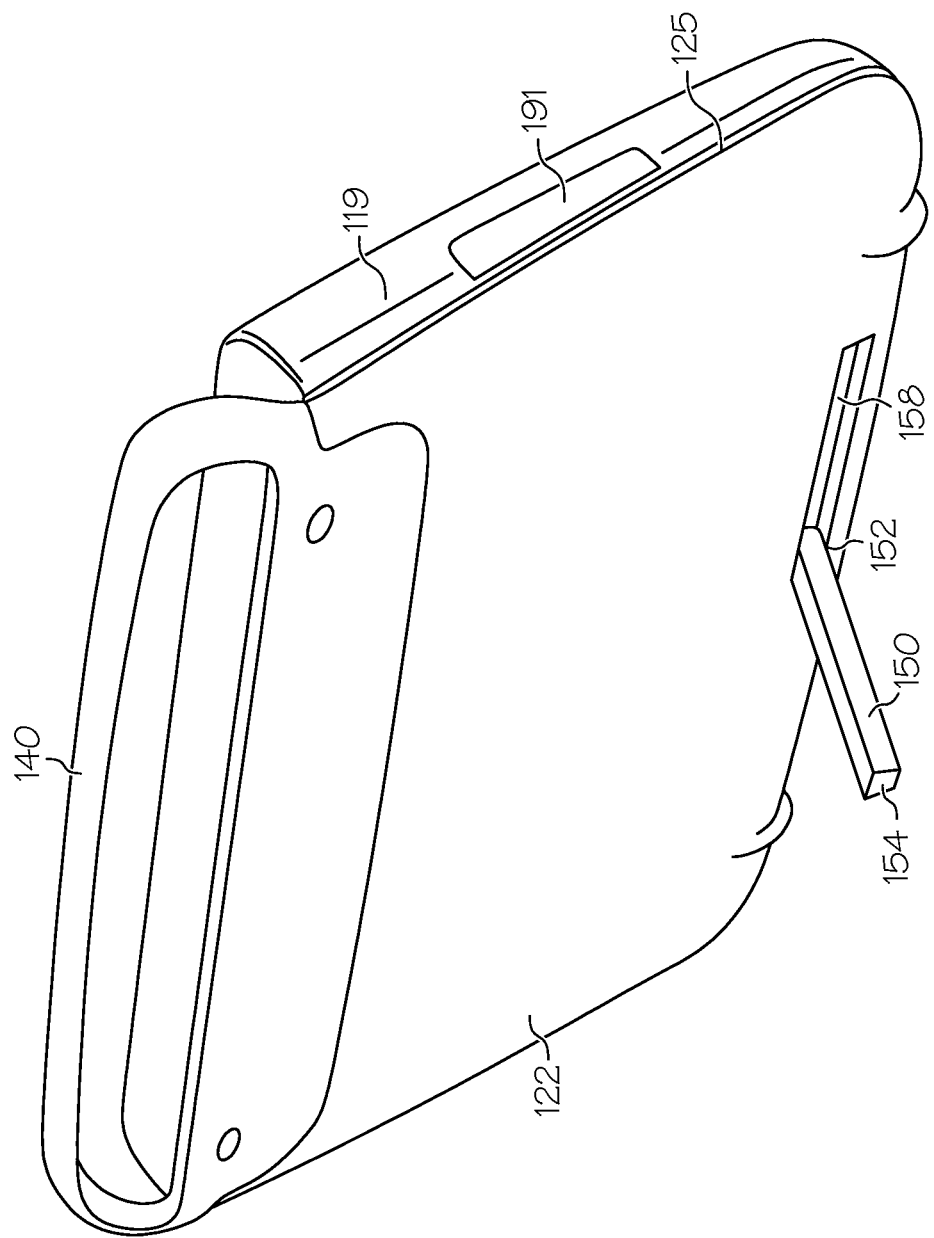
FIG. 2 is a perspective view of a convertible PC in the tablet mode, according to an exemplary embodiment.

Referring to FIG. 2, an exemplary embodiment of a convertible PC 10 may further include a carrying handle 140, mechanical latches 191, and a photo frame stand 150. The mechanical latches 191 may be disposed on the side walls 119 of the upper housing 110 (see also FIG. 4). The mechanical latches 191 may be used to release the upper housing 110 from the lower housing 120 when converting the convertible PC 10 from the tablet mode to the keyboard operation mode. The photo frame stand 150 may have a first end 152 pivotally connected to the bottom 122 of the lower housing 120 inside a slot 158. A second end 154 of the photo frame stand 150 may support the convertible PC 10 in an upright position, as shown in FIG. 2. The photo frame stand 150 may serve as a stand when the convertible PC 10 is used as a TV, an e-book reader, a photo displayer, or a web browser. The slot 158 may be used for receiving and nesting the photo frame stand 150.

Figure 3A:
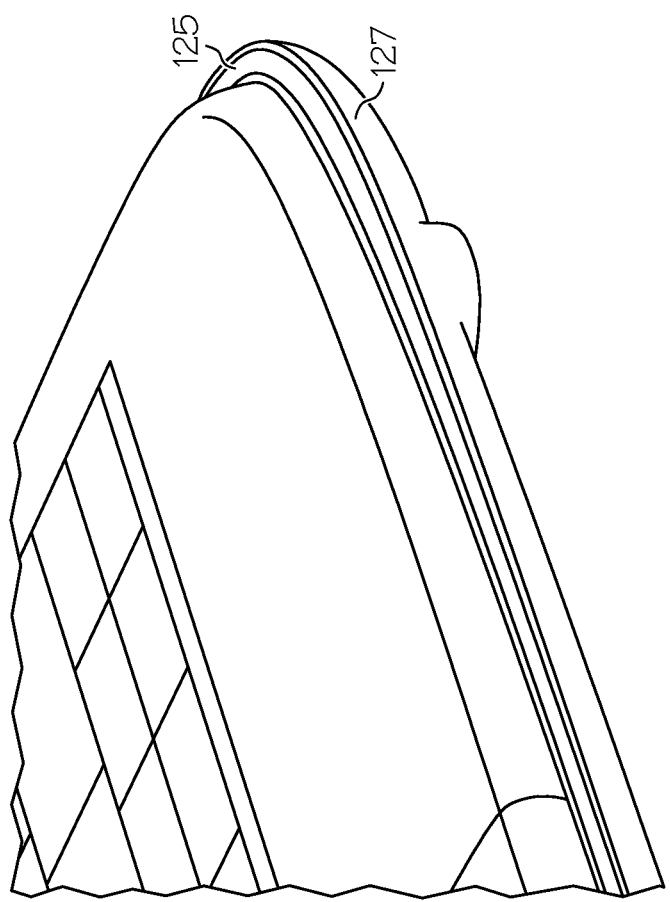
FIG. 3A is a close up view of a part of a convertible PC in the keyboard operation mode, according to the exemplary embodiment shown in FIG. 3.

As shown in FIGS. 3 and 3A, the gasket 125, such as an o-ring, for example, may be disposed in an annular lip recess 127 around all or a portion of an outer perimeter of the lower housing 120. The gasket 125 may serve to seal the upper housing 110 to the lower housing 120 when the convertible PC 10 is in the tablet mode (see step 101 of FIG. 1). Additionally, the gasket 125 may act to seal and protect the interior components by preventing liquid from coming inside the convertible PC 10. The gasket 125 may be made of a resilient, elastomeric, water impermeable material, such as rubber. When the convertible PC is in the tablet mode, the upper housing 110 may be sealed against the lower housing 120 with the gasket 125 sandwiched therebetween.

In an exemplary embodiment, the LCD screen 112 may be a touch screen, which may be used as an alternative input device. The touch screen may further include a power switch 117. A user may power on or off the convertible PC 10 by touching the power switch 117.

As shown in FIG. 4, a plurality of connectors 180 may be disposed on the side wall 129. The connectors 180 may be used to connect a printer, a scanner, a speaker, or an ear phone to the convertible PC 10. An optical disk drive (ODD), such as a DVD, a CD, or a blue-ray disc drive, may be further disposed on the side wall 129.

Still in FIG. 4, the upper housing 110 may provide a complementary shaped recess 115 in the cover side 114 for receiving and nesting the folding linkage assembly 130. The recess 115 may be coextensive with the upper housing cover side when the convertible PC 10 is in the tablet mode. The folding linkage assembly 130 may nest in a space in the battery pack 190, such as lithium polymer battery pack, for example, when the device is in the tablet mode. The battery pack 190 may be secured on the cover side 114 of the upper housing 110.

It should be understood, of course, that the foregoing relate to exemplary embodiments of the invention and that modifications may be made without departing from the spirit and scope of the invention as set forth in the following claims.

I claim:

1. A computing apparatus comprising: a lower housing; a keyboard in the lower housing; a folding linkage assembly adapted to connect to the lower housing; an upper housing having opposing sidewalls; a display between the opposing sidewalls of the housing; the upper housing operably mounted to the folding linkage assembly and pivotable with respect to the folding linkage assembly for movement between a tablet mode and a keyboard operation mode, wherein the upper housing is closed over the lower housing in the tablet mode, wherein the lower housing is uncovered by the upper housing in the keyboard operation mode, wherein the folding linkage assembly folds into a recess on an underside of the upper housing, the folding linkage assembly having: a first end coupled to a first folding linkage receiving element disposed transversely across a cover side surface of the upper housing; and a second end coupled to a second folding linkage receiving element disposed transversely across a rear portion of the lower housing; a latch disposed on both side walls of the upper housing adapted to release the upper housing from the lower housing when converting the computing apparatus from the tablet mode to the keyboard operation mode; and a gasket, positioned around a periphery of the keyboard, disposed in an annular ring recess around an entire outer perimeter of the lower housing and disposed to seal the keyboard from exposure to a surrounding environment when the upper housing is closed over the lower housing.

2. The computing apparatus of claim 1, wherein the folding linkage assembly interfaces the lower housing and the upper housing.

3. The computing apparatus of claim 1, wherein the display is disposed on a screen side opposite to the cover side of the upper housing.

4. The computing apparatus of claim 1, wherein the upper housing pivots over substantially 180 degrees of angular movement with respect to the lower housing.

5. An electronic computing device comprising: a lower housing having a bottom and an oppositely disposed platform operational surface, the operational surface including a keyboard; an upper housing having a screen side and an oppositely disposed cover side, the upper housing being operatively coupled to the lower housing for movement between a tablet mode and a keyboard operation mode wherein a folding linkage assembly folds into a recess on an underside of the upper housing; the folding linkage assembly having: a first end coupled to a first folding linkage receiving element disposed transversely across the cover side of the upper housing; and a second end coupled to a second folding linkage receiving element disposed transversely across a rear portion of the lower housing; a touch screen coupled to the screen side of the upper housing; a water tight seal around the touch screen; a gasket adapted to effect a seal between the lower housing and the upper housing which, upon closing of the lower housing to the upper housing to form a closed position, the gasket is sandwiched therebetween and the touch screen is visible from an exterior of the electronic device and the keyboard is covered by the cover side and hidden from view and sealed off from the exterior by the gasket in the closed position; wherein the gasket is formed of a resilient material and is disposed in an annular lip recess around an entire outer perimeter of the lower housing; and a latch disposed on the upper housing adapted to release the upper housing from the lower housing when converting the electronic computing device from the tablet mode to the keyboard operation mode.

6. The electronic computing apparatus of claim 5, further comprising a power switch on the touch screen.

7. The electronic computing apparatus of claim 5, wherein the gasket is made of a water impermeable material.

8. The electronic computing apparatus of claim 5, wherein the water impermeable material is a rubber o-ring.

9. The electronic computing apparatus of claim 5 further comprising a photo frame stand operably connected to the bottom of the lower housing.

10. A mobile computing device comprising: a lower housing having side walls, a front side, and a bottom side; an upper housing having a screen carried on a first side and a cover carried on a second, opposite side, the upper housing being operably coupled to the lower housing for movement between a tablet mode and a keyboard operation mode, wherein, the upper housing, with the screen facing outward from the lower housing, is configured to seal liquid off from a keyboard on the lower housing with a gasket sandwiched between the front side of the lower housing and the cover, and a watertight seal disposed around the screen; the gasket disposed in an annular ring recess around an entire outer perimeter of the lower housing; a folding linkage assembly having a first end coupled to a first folding linkage receiving element disposed transversely across the upper housing cover and a second end coupled to a second folding linkage receiving element disposed transversely across a rear portion of the lower housing, wherein the folding linkage assembly is configured to move the upper housing upward and away from the lower housing and pivot about the linkage assembly connected to the lower housing; and a latch disposed on each of opposing side walls of the upper housing adapted to release the upper housing from the lower housing when converting the mobile computing device from the tablet mode to the keyboard operation mode.

11. The mobile computing device of claim 10, further comprising a plurality of connectors on a side wall of the lower housing.

12. The mobile computing device of claim 10, further comprising a battery pack secured to the cover side of the upper housing.

13. The mobile computing device of claim 10, wherein the folding linkage assembly includes an outwardly facing surface side and an oppositely disposed inwardly facing surface side wherein the outwardly facing surface side is disposed adjacent to and substantially parallel with a complementary shaped upper housing recess surface and inwardly facing surface side is disposed adjacent to and substantially parallel with a platform operational surface of the lower housing when the device is in the tablet mode.

* * * * *